United States Patent

[11] 3,602,035

[72] Inventors Carl R. Spohn
Natrona Heights;
Ross M. Stewart, Pittsburgh, both of, Pa.
[21] Appl. No. 880,838
[22] Filed Nov. 28, 1969
[45] Patented Aug. 31, 1971
[73] Assignee Gulf Research & Development Company
Pittsburgh, Pa.

[54] APPARATUS FOR TESTING THE LUBRICATING PROPERTIES OF AN OIL
11 Claims, 8 Drawing Figs.
[52] U.S. Cl. .................................................. 73/10,
73/54, 73/59, 73/64
[51] Int. Cl. .................................................. G01n 3/56,
G01n 33/26
[50] Field of Search .......................................... 73/54, 10,
64, 59, 57

[56] References Cited
UNITED STATES PATENTS
3,353,398  11/1967  Lohmar et al. ............... 73/10

Primary Examiner—Louis R. Prince
Assistant Examiner—Joseph W. Roskos
Attorneys—Meyer Neishloss, Deane E. Keith and William Kovensky ABSTRACT: Apparatus for testing the friction-reducing characteristics of an oil utilizing a cylinder piston rod and piston assembly and a cantilever spring which tends to cock the piston in the cylinder as it is cranked. This simulates severe friction conditions encountered in an engine under some starting conditions. Means to control the temperature of the cylinder and means to run tests automatically are also provided.

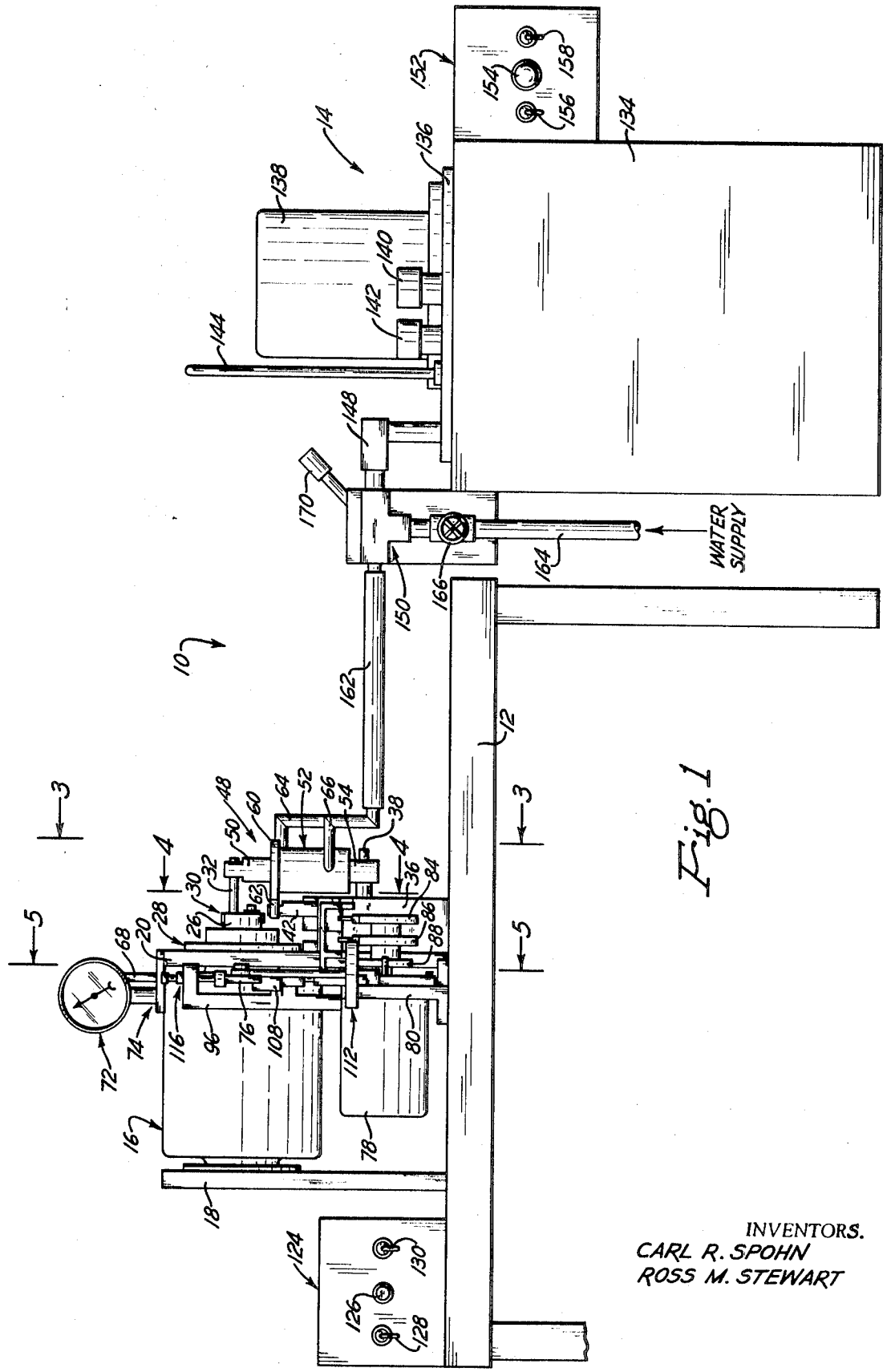

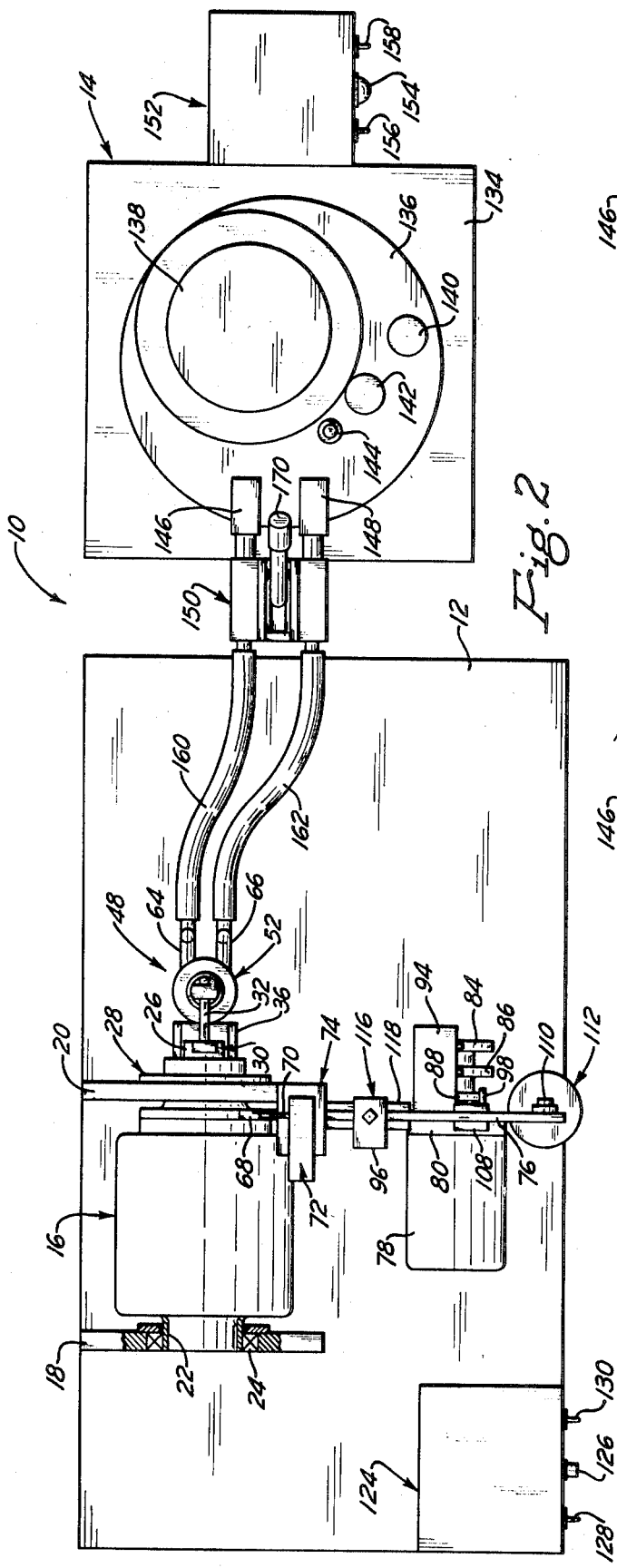
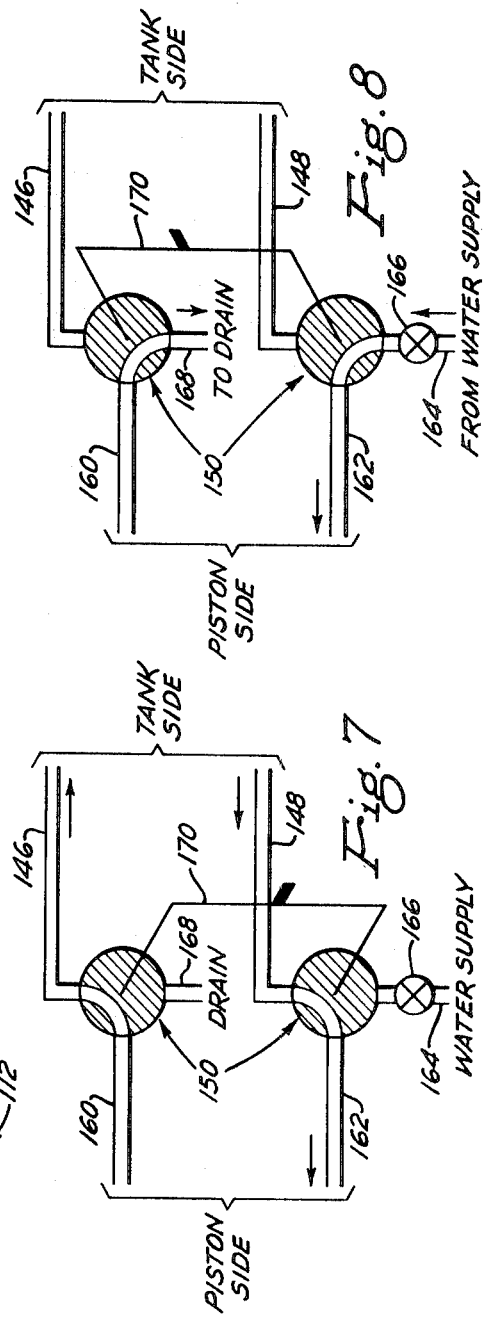

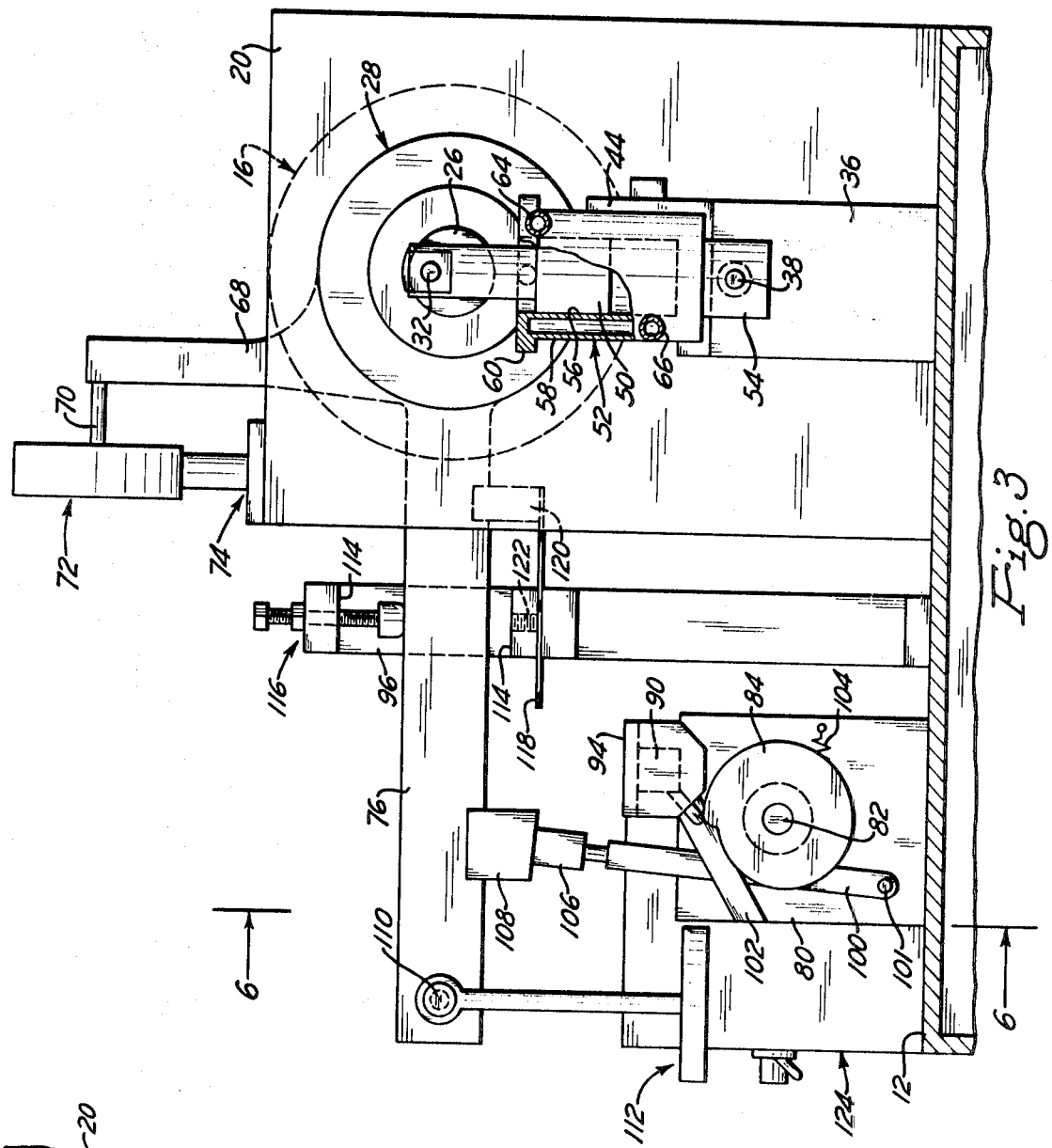
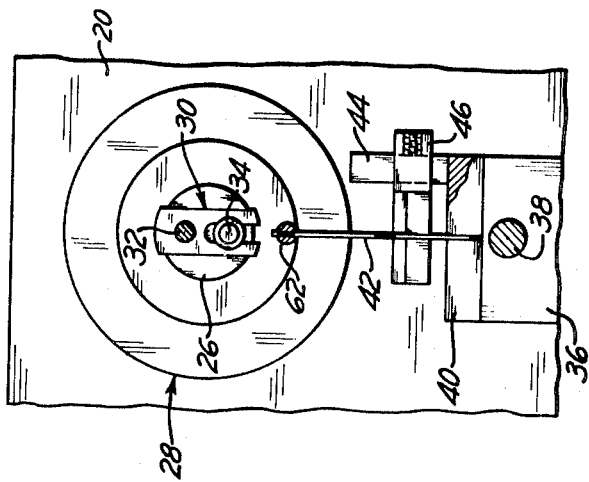
Fig. 3
Fig. 4
INVENTORS.
CARL R. SPOHN
ROSS M. STEWART

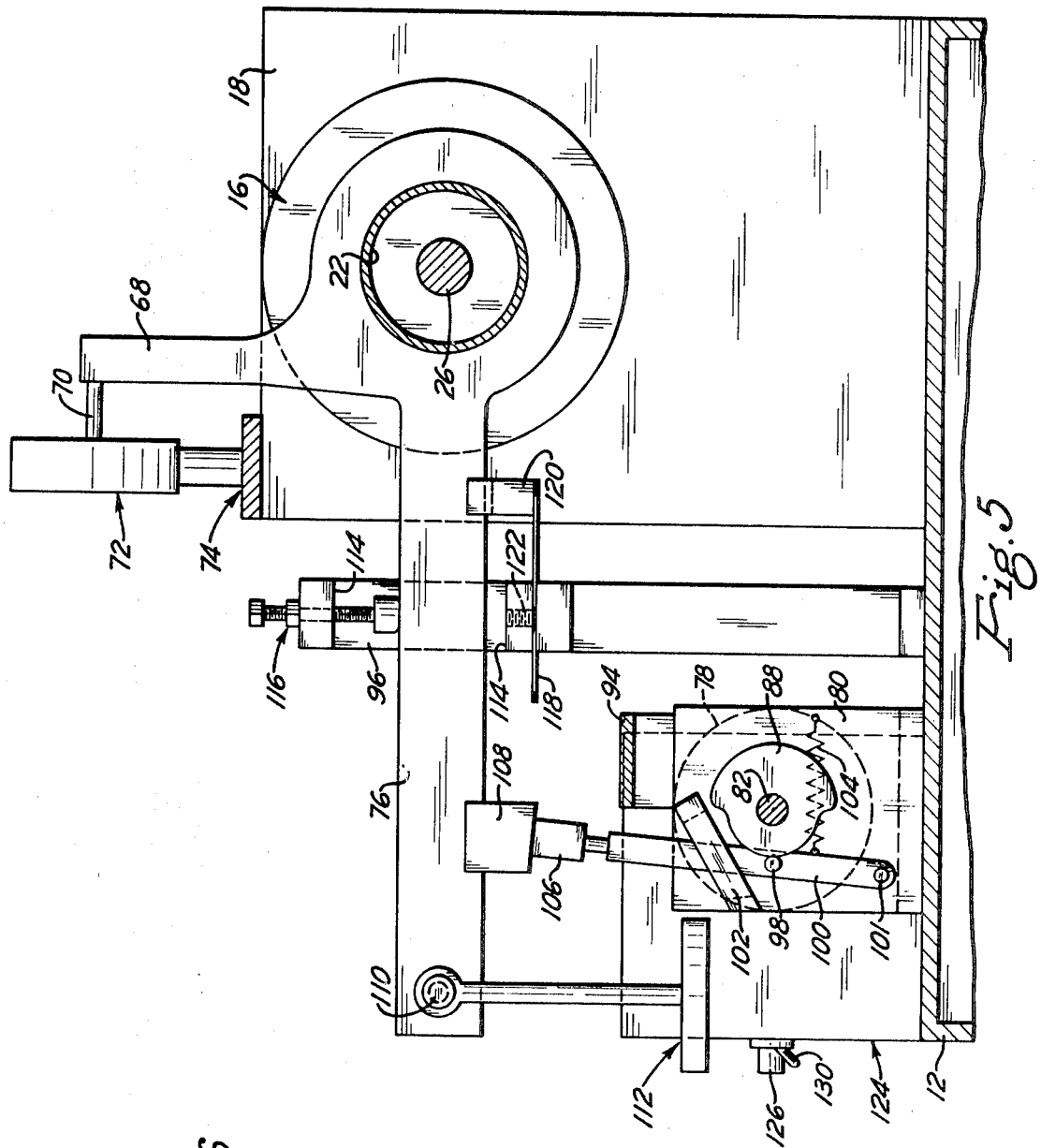
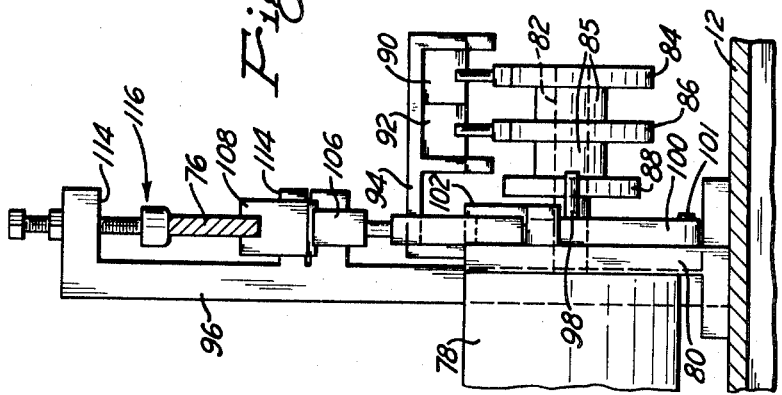
INVENTORS.
CARL R. SPOHN
ROSS M. STEWART

APPARATUS FOR TESTING THE LUBRICATING PROPERTIES OF AN OIL

This invention pertains to apparatus for testing the lubricating properties of an oil. More in particular, the invention pertains to improved apparatus of the character described utilizing a cylinder and piston wherein the piston is reciprocated within the cylinder with the oil to be tested forming a film therebetween. Means are provided to cause the cylinder to oscillate on a fixed pivot against a spring bias load to thereby create severe lubricating conditions at the "edges" of the piston, to accurately simulate usage in an actual internal combustion reciprocative piston engine.

The most certain way of testing the lubricating quality of an oil is to use it in a full size engine. However, for test purposes, this procedure is exceedingly expensive, and requires an objectionably long period of time. Therefore, it is desired to provide a relatively small, fast, simple to use laboratory instrument wherein may oils can be rapidly tested under identical conditions, and with a high degree of correlation between the test results and the results that would be obtained when that oil is used to a full size engine. Further, the invention provides means to control the temperature of the oil film to thereby simulate various different problem lubrication situations, such as cold starting in winter, hot restarting, and the like.

The utilizes a relatively small cradle-mounted motor. The rotor of the motor drives the piston of the apparatus of the invention, and the torque developed between the cylinder and the piston is transmitted via the electrical field within the motor to the motor armature and casing. The degree of rotation of the cradle-mounted armature and casing is thus a direct measure of the torque, which is in turn a direct measure of the lubricating properties of the test oil. The lower the torque the better are the lubricating qualities of the oil under test. Put another way, the measured torque is directly proportional to the friction reducing characteristics of the oil under test. By holding all other conditions constant from oil to oil, accurate comparative results between various different oils are obtained. Actual tests have proven that the apparatus of the invention produces results having a high degree of correlation to full scale engine data. Additionally, the invention provides results faster and at lower cost then full size engine tests.

The provides means to load the cylinder in its oscillating motion during the test. Biasing the cylinder tends to cock the one-piece piston and piston rod in the cylinder, thus loading the oil film at the leading and trailing edges of the piston as it reciprocates. A cantilever spring is provided for this purpose with its null point geometrically coinciding with the rest or null position of the cylinder. By changing the spring strength and/or effective length, the degree of loading is easily controlled. The use of a cantilever spring, as opposed to a coil spring, provides the important advantage that the loading on the oil film is applied equally, increasingly with increasing distance from the null point, and automatically to both sides as the cylinder is oscillated from one side to the other of its null point. Additionally, the load could be selectively applied to either side of the piston.

The invention also provides a completely automatic test apparatus. The operator simply puts a film of oil to be tested on the cylinder wall, assembles the apparatus, and thereafter the entire test is run automatically. This automated test procedure eliminates all additional variable human elements that might be introduced while running a test.

The invention also provides means to simply heat or cool the cylinder, and to rapidly cool it to facilitate handling when hot oil tests are being run.

The above and other advantages of the invention will be pointed out or will become evident in the following detailed description and claims, and in the accompanying drawing also forming a part of the disclosure, in which:

FIG. 1 is a side elevational view of an apparatus embodying the invention;

FIG. 2 is a top plan view thereof;

FIGS. 3, 4 and 5 are cross-sectional views taken on lines 3—3, 4—4 and 5—5, respectively, of FIG. 1;

FIG. 6 is a cross-sectional view taken on line 6—6 of FIG. 3; and

FIGS. 7 and 8 are schematic diagrams of the coolant control system.

Referring now in detail to the drawing, 10 designates an apparatus embodying the invention which comprises a stand 12 which may simply comprise a table or the like to support most of the remainder of the apparatus. Reference numeral 14 indicates the coolant control system generally.

A motor 16 is mounted on table 12 by means of a rear upright 18 and a front upright 20. Motor 16 is of the cradle-mounted type, that is, both the rotor and the casing or stator or armature are free to move. To this end, a rear flange of stator 22, FIG. 2, is rotatably mounted in the rear upright 18 by means of suitable bearings 24. A similar structure, not shown, is provided at the front end of the stator 22 of motor 16. The electrical leads to the motor have been omitted for the sake of clarity.

The rotor shaft 26 of motor 16 passes through suitable support means, a dust cover, bearings, and the like, all of which together are indicated by reference numeral 28, in front upright 20, and carries an adjustably mounted piston driving pin block 30. At one end, pin block 30 carries a piston driving pin 32, and the opposite end of said pin block 30 is bifurcated to fit around a locking screw assembly 34 mounted in the motor rotor shaft. Locking screw 34 may be mounted off the centerline of the rotor shaft 26.

At its lower end, in line with the centerline of the motor 16, front upright 20 carries a cylinder mounting block 36. Extending frontwardly of block 36 is a cylinder pivot pin 38. At the top end of cylinder mounting block 36 is a spring anchor block 40 having means to releasably mount one end of a cantilever spring 42. To one side of the vertical line defined by the axes of pin 38, spring 42, and the rotor shaft 26, on upright 20, is a rail 44. Slidably mounted on rail 44 is a cantilever spring length adjusting block 46.

Mounted between the pins 32 and 38 is a test piston and cylinder assembly 48 comprising an integral piston and piston rod 50, and a jacketed cylinder assembly 52. The upper free end of piston rod 50 is formed with a suitable opening to rotatably receive pin 32. The lower end of cylinder assembly 52 is formed with a tang 54 which is formed with a suitable opening to rotatably receive cylinder pin 38. Referring to FIG. 3, above tank 54, cylinder assembly 52 comprises concentric inner and outer walls 56 and 58 which are joined at their top ends by a top flange 60. Flange 60, see FIGS. 1 and 4, carries a bifurcated pin 62 within which fits the upper free end of cantilever spring 42. The space defined between walls 56 and 58 around the sides and bottom of the piston 50 communicates with upper and lower coolant conduits 64 and 66.

The piston and cylinder assembly 48 is the "heart" of the apparatus. Oils to be tested are applied between the operating surfaces of the piston and cylinder and these surfaces have the usual highly polished finish, and fit snugly together to provide a space for a film of such a lubricating oil. The temperature of the oil while being tested can be controlled by the flow of heated or cooled fluid through the conduits 64 and 66. The test oil is very readily changed. The entire assembly 48 can be removed from the apparatus by sliding the same to the right in FIG. 1 thereby freeing it of the two pins 32 and 38 an the cantilever spring 42. Oil is tested by simply applying a new assembly 48, or cleaning the same assembly and applying the new oil. The apparatus is reassembled for test purposes by simply sliding an assembly 48 carrying a new oil onto the pins 32 and 38 and the spring 42.

Since both the casing and the rotor of motor 16 are free to move, the friction force developed between the piston 50 and cylinder 52 is measured by measuring the reaction force on the piston as transmitted by the electrical field in the motor to the motor casing. That is, when the piston is driven up and down in the cylinder a certain amount of resistance will be encountered. This resistance will be proportional to the lubricating characteristics or qualities of the oil under test. The better the oil, the less the friction. The cradle will rotate, in a direction opposite the direction of rotation of the rotor, an amount proportional to the friction force developed in the piston and cylinder assembly.

To this end, see FIG. 5, the motor casing carries a flange 68 which cooperates with the operating member 70 of a dial-type micrometer 72 or other suitable motion measuring means. Micrometer 72 is mounted on a bar 74 which is fixed to the upper end of front upright 20 suitably positioned so that its operating member 70 can cooperate with flange 68. Stator 22 also carries an arm 76 which is instrumental in achieving fully automatic operation, as will appear below.

The automatic operation apparatus comprises a small, slow speed synchronous motor 78 which is mounted on a mounting block 80 which is fixed to stand or table 12 in spaced relation to the motor 16. The shaft 82 of motor 78 carries three cams 84, 86 and 88. Shaft 82 also carries a pair of suitable collars 85 to keep the cams in suitably spaced relation to each other on the shaft. Each of the cams 84 and 86 cooperate respectively with one of a pair of microswitches 90 and 92. The microswitches 90 and 92 are mounted on mounting block 80. Cam 88 cooperates with a pin 98 fixed to a link 100 which is pivotally mounted on mounting block 80 on a pivot 101. A strap 102 is fixed to block 80 and serves to define the plane of motion of link 100. A coil spring 104 has one end fixed to block 80 and its other end fixed to link 100 so as to normally urge pin 98 against cam 88. At its upper end link 100 carries a prop 106 which cooperates with a truncated block 108 fixed to arm 76. At its outer end, arm 76 carries a bolt around which is loosely mounted the eye of a weight holder 112. By selectively adding more or less weight on holder 112, the apparatus may be calibrated so that the readings on micrometer 72 may be converted to torque units, such as inch-pounds, in a manner well known to those skilled in the art.

A multipurpose standard 96 is provided and is formed with a cutout 114 to encompass arm 76. The upper flange of the standard carries a stop block assembly 116 which may be set to limit the upward motion of the arm 76, and which is set in conjunction with the link 100, prop 106 and block 108 to hold the arm 76 and the motor casing 22 rigid except when the prop 106 is out from under the block 108, as will be explained in the Operation section below. Means are provided to define the limits of downward motion of the arm 76 and to resiliently bias the arm against said downward motion. To this end, a cantilever spring 118 carrying a main arm stop block 120 at its front end is adjustably mounted in standard 96 just below cutout 114 by means of a setscrew 122.

The part of the apparatus of the invention mounted on table 12 is completed by an electrical control box 124 having a pushbutton switch 126, a pair of toggle switches 128 and 130, the functions of which will appear below.

Coolant system 14 comprises a main sump or tank 134 which includes a lid 136. The sump 134 is filled to the degree desired with a suitable heat transmitting fluid, preferably glycol when hot tests are being run, methyl alcohol and dry ice when cold tests are run. Mounted on lid 136 are the coolant pump motor 138, a temperature controller 140, a heating element 142, and a thermometer 144. Outflow and inflow coolant lines 146 and 148 extend from sump 134 to a master fluid control valve 150 mounted on sump 134. On the opposite end of the sump is an electrical control box 152 having an indicator light 154 and a pair of toggle switches 156 and 158. The electrical lines for electricity supply and interconnecting the control boxes 124 and 152 and the various electrical components that they service have been omitted for the sake of clarity, such circuitry being conventional.

Valve 150 comprises means to separately handle the flow from the sump to the cylinder, and the return flow from the cylinder to the sump. In effect, it comprises a pair of three position valves. Each conduit 64 and 66 is connected by a flexible hose 160 and 162 to the same respective position of each half of valve 150. The third position on half of valve 150 is connected to a cold water supply conduit 164 including a manual shutoff valve 166, an the third position of the other half of said valve 150 is connected to a drain line 168. A single manual operating member 170 operates both halves of the valve 150. In the embodiment of the invention which has been successfully built, a pair of three position valves rather than a single dual valve was utilized. The operation of the coolant system will be explained in the operation section below in conjunction with the schematic diagrams of FIGS. 7 and 8.

OPERATION

Prior to operating the device, certain operating conditions must be predetermined. For example, if hot oil tests are to be run, the operating temperature must be determined. For purposes of example let it be assumed that 210° F. is to be the test temperature and the low-speed hot-cranking properties of crankcase-lubricating oils are under test. The switch 156 is operated to turn on the heater 142, switch 158 is operated to turn on the pump, and the temperature controller 140 is set at 210° F. to automatically maintain that temperature. The temperature of the coolant, usually glycol for hot tests, in the sump 134 is monitored on the thermometer 144. Upon the glycol reaching the predetermined temperature, the valve 170 is thrown to a position of FIG. 7 so that the heated glycol flows through the cylinder and back to the sump. The flow path is flow line 148, one side of valve 150, hose 162, through the cylinder 52 to bring it up to temperature, and back to the sump via conduit 64, hose 160, the other side of valve 150, and flow line 146. Switches 156 and 158 are left on for the remainder of the tests.

The switch 128 is turned on to supply power to all of that part of the system mounted on table 12. The switch 130 is used to select either 110 VAC or 220 VAC power for the cranking motor 16. The higher voltage is used only for very high friction tests. The push button 126 starts motor 78, and this button is not operated until the whole system is ready to start a test, including having achieved stable temperature conditions. Upon operating pushbutton 126, motor 78 turns its three cams 84, 86 and 88 through one revolution, which is equivalent to one test cycle. A cycle time of 12 seconds has been found to be satisfactory. The first occurrence is that cam 86 operates its microswitch 92 to establish a holding circuit to keep motor 78 operating. A low spot on this cam will later stop the automatic cycle. Almost simultaneously, cam 84 operates its microswitch 90 to start cranking motor 16. A very short time thereafter, cam 88 physically moves pin 98 and its link 100 on pivot 101 to move the prop 106 out from under block 108 thus rendering arm 76 and the stator 22 of the motor 16 free to rotate within the limits defined by stop assembly 116 and the bottom of cutout 114. Spring 118 and block 120 supply a predetermined biasing force against downward motion of the arm 76.

Dial micrometer 72 is of the "maximum reading hand" type and will therefore record the maximum rotation of the motor casing. The maximum dial reading, all other factors being held constant, is proportional to only the cranking torque, and thus this reading is a measure of the friction reducing qualities of the oils one versus the other. The dial readings may be changed to torque units with suitable calibration curves. Such curves may be made by using suitable single grade calibration oils, as is known to those skilled in the art.

Prior to cam 86 stopping motor 78 to stop the cycle, cam 88 will present a "low" to pin 98, thus allowing spring 104 to return link 100 to the FIG. 5 position, thus locking the casing 22 between the stop 116 and the prop 106. The cranking motor and associated parts are now automatically ready for the next test. Thereafter, cams 84 and 86 present lows to their microswitches 90 and 92 to stop motor 16 and then motor 78.

At the end of the test, in order to facilitate handling the hot cylinder 52, valve 166 is opened to allow the flow of cold water to the cylinder coolant jacket between its walls 56 and 58. Then handle 170 is moved from the FIG. 7 to the FIG. 8 position. The flow of hot fluid from sump 134 is thus shut off and cold water runs through the halves of valve 150, the hoses 160 and 162, the conduits 64 and 66, through the cylinder and out the drain line 168. The relatively small cylinder is thus rapidly cooled to facilitate handling. The handle 170 need only be moved back to the FIG. 7 position to again achieve the desired temperature conditions for the next test. Valve 166 is closed after the cylinder is cool.

The apparatus of the invention provides great versatility as to determining the conditions surrounding a test. Firstly, cylinder loading cantilever spring 42 is selected as to stiffness, weight, and the like to provide any desired predetermined force to load the cylinder as to its resistance against side-to-side motion as it is driven by the both reciprocating and oscillating integral piston and piston rod 50. The eccentrically mounted driving pin, which is adjustable as to the distance it is mounted off center by means of screw assembly 34 and bifurcated block 30, determines the degree of oscillating motion off the centerline. The resistance offered by the cantilever spring 42 may be further increased or decreased, in addition to physically changing the spring, by adjustment of spring block 46 up and down on its rail 44 which effectively shortens or lengthens the spring.

This side loading is an important advantage of the apparatus of the invention in that it permits more accurate simulation of true engine conditions by tending to equally load the "corners" or "edges" of the piston in the cylinder to achieve a shear stress on the oil film similar to that encountered in a conventional internal combustion engine. However, if desired for any reason, the loading feature can be omitted by simply not providing a spring 42. Further, if desired, the cylinder can be loaded on only one side by placing the free end of spring 42 to one side of pin 62 rather than in the slot in that pin, see FIG. 4.

Two other adjustments are possible as to initial conditions settings. These comprise adjustment of the length of the piston stroke by manipulation of pin block 30 on screw assembly 34, and selection of and length of cantilever spring 118 which loads the arm 76 during a test.

While the invention has been described in detail above, it is to be understood that this detailed description is by way of example only, and the protection granted is to be limited only within the spirit of the invention and the scope of the following claims.

We claim:

1. In combination, support means and a cylinder and piston assembly, means to mount the cylinder of said piston and cylinder assembly on said support means for oscillating motion of said cylinder about an oscillating axis, said oscillating axis being disposed substantially perpendicular to the axis of said cylinder, piston driving means mounted on said support means to simultaneously reciprocate said piston within said cylinder and to cause said piston and cylinder assembly to oscillate about said oscillating axis in a plane containing the axis of said cylinder; and means to resiliently bias said cylinder when said cylinder moves to at least one side of a geometrically centered null position in its oscillating motion in said plane about said oscillating axis from side-to-side of said null position, said biasing means increasingly biasing said cylinder with increasing motion of said cylinder to said at least one side of said null position; whereby the lubricating qualities of an oil between said piston and said cylinder may be measured by measuring the reaction at said driving means of the resistance against motion of said piston within said cylinder.

2. The combination of claim 1, wherein said biasing means additionally equally biases on both sides of said cylinder when it moves from side-to-side of said null position.

3. The combination of claim 1, said biasing means comprising a cantilever spring having one end removably fixed to said support means and extending parallel to the axis of said cylinder and piston assembly in the null position of said cylinder, and means on said cylinder operatively cooperable with the free end of said cantilever spring.

4. The combination of claim 3, and means cooperable with said support means and said cantilever spring adapted to control the effective length of said cantilever spring.

5. The combination of claim 1, and means to control the temperature of said cylinder.

6. The combination of claim 5, said cylinder temperature control means comprising a dual wall construction of said cylinder, a pair of conduits cooperating with the space between the dual walls of said cylinder, a coolant sump containing temperature controlling liquid, means to control the temperature of said liquid, and means to pump said liquid from said sump through said cylinder and back to said sump.

7. The combination of claim 6, fluid flow conduit means interconnecting said cylinder and said sump, three way valve means in said conduit means, and means to flow a liquid other than the liquid in said sump via said valve means through said cylinder and to a drain, whereby operation of said valve means when using heated liquid in said sump permits flowing of cold water through said cylinder to rapidly cool said cylinder.

8. The combination of claim 1, said piston driving means comprising a cradle-mounted electric motor, a piston driving pin block at one end of the rotor of said motor, a piston driving pin extending from said pin block into a suitably formed opening in the free end of said piston, and means to control the distance between the axis of said piston driving pin and the axis of said motor rotor.

9. The combination of claim 1, said piston driving means comprising a cradle-mounted electric motor, means to measure the amount of motion of the casing of said motor produced as a reaction of the resistance against motion of said piston within said cylinder, said motion measuring means comprising a flange fixed to said motor casing, and amount of motion measuring means operatively cooperable with said flange.

10. The combination of claim 1, said piston driving means comprising a cradle-mounted electric motor, an arm fixed to the casing of said motor, means to selectively rigidly fix said arm and said casing and to selectively release said arm to measure the reaction of the resistance against motion of said piston in said cylinder when a test of a lubricating oil in said cylinder is being made, and means to automatically start said cradle-mounted motor and run said test.

11. The combination of claim 10, said automatic testing means comprising a synchronous motor mounted on said support means, first, second and third cams driven by said synchronous motor, an electric control box including a pushbutton switch to start said synchronous motor, a first microswitch cooperable with said first cam to establish a holding circuit to keep said synchronous motor running for a length of time determined by said first cam, a second microswitch operable by said second cam to start said cradle-mounted motor and to keep said cradle-mounted motor running for a length of time determined by said second cam, and spring loaded operating arm locking means operable by said third cam to unlock said operating arm for a predetermined length of time and in relation to the timing determined by said first and second cams.